US008847424B2

(12) United States Patent
Rebsdorf et al.

(10) Patent No.: US 8,847,424 B2
(45) Date of Patent: Sep. 30, 2014

(54) WIND TURBINE WITH SEALED OFF STATOR CHAMBER (71) Applicant: Envision Energy (Denmark) ApS, Silkeborg (DK)

(72) Inventors: Anders Varming Rebsdorf, Skanderborg (DK); Mogens Christensen, Tjele (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 99 days.

(21) Appl. No.: 13/693,415

(22) Filed: Dec. 4, 2012

(65) Prior Publication Data
US 2013/0154272 A1 Jun. 20, 2013

(30) Foreign Application Priority Data

Dec. 7, 2011 (DK) .................................. 2011 70677
Oct. 4, 2012 (DK) .................................. 2012 70603
Oct. 5, 2012 (DK) .................................. 2012 70604

(51) Int. Cl.
F03D 9/00 (2006.01)
H02P 9/04 (2006.01)
H02K 55/04 (2006.01)
H02K 7/18 (2006.01)
F03D 11/00 (2006.01)
H02K 5/128 (2006.01)

(52) U.S. Cl.
CPC ................ *F03D 11/00* (2013.01); *H02K 55/04* (2013.01); *F03D 9/002* (2013.01); *Y02E 10/725* (2013.01); *H02K 7/1838* (2013.01); *F05B 2240/57* (2013.01); *Y02E 40/625* (2013.01); *H02K 5/128* (2013.01); *Y02E 10/726* (2013.01)
USPC .......................................................... 290/55

(58) Field of Classification Search
CPC ........... F03D 9/002; F03D 11/00; F03D 9/00; H02K 7/1838; H02K 5/128; H02K 55/04; H02K 7/18; Y02E 10/725; Y02E 10/726; Y02E 40/625; Y02E 10/72; Y02E 10/74; Y02E 10/728; F05B 2240/57
USPC ........................... 290/55, 54, 44, 43; 505/166
See application file for complete search history.

(56) References Cited

U.S. PATENT DOCUMENTS

| 1,678,380 | A | 7/1928 | Cooper |
| 2,573,126 | A | 10/1951 | Andrus |

(Continued)

FOREIGN PATENT DOCUMENTS

| EP | 0 422 221 A1 | 4/1991 |
| EP | 2 299 567 A2 | 3/2011 |

(Continued)

*Primary Examiner* — Javaid Nasri
(74) *Attorney, Agent, or Firm* — Roberts Mlotkowski Safran & Cole, P.C.; David S. Safran (57) ABSTRACT A wind turbine having a wind turbine tower with a nacelle; a wind turbine rotor hub with at least one rotatably mounted wind turbine blade; a shaft coupled to the wind turbine rotor hub and a generator. The generator has a rotor with at least one superconducting rotor coil arranged rotatably relative to a stator having at least one stator coil. The rotor is arranged in a rotor housing and the stator is arranged in a stator housing, the housings being separated by a rotor-stator gap. The stator housing has a stator inner shell and a stator outer shell connected together by at least one stator housing end plate. The stator inner shell has a first inner shell element attached to a stator iron which is connected to a second inner shell element. A pressure plate is attached to the second inner shell element and the stator outer shell.

21 Claims, 10 Drawing Sheets

(56) References Cited

U.S. PATENT DOCUMENTS

| | | |
|---|---|---|
| 2,654,848 A | 10/1953 | Schaefer |
| 2,798,173 A | 7/1957 | Penlington et al. |
| 2,809,310 A | 10/1957 | Dunn et al. |
| 2,961,716 A | 11/1960 | Luenberger |
| 2,965,776 A | 12/1960 | Bluth et al. |
| 3,914,859 A | 10/1975 | Pierson |
| 4,146,804 A | 3/1979 | Carr, Jr. |
| 4,228,375 A | 10/1980 | Beermann et al. |
| 4,862,023 A | 8/1989 | Laumond et al. |
| 6,879,081 B1 | 4/2005 | Howard et al. |
| 6,888,286 B2 | 5/2005 | Howard et al. |
| 8,040,000 B2 | 10/2011 | Baik et al. |
| 8,040,012 B2 | 10/2011 | Meinke et al. |
| 2006/0186749 A1* | 8/2006 | Strydom .................. 310/103 |
| 2009/0224550 A1 | 9/2009 | Bray et al. |

FOREIGN PATENT DOCUMENTS

| | | |
|---|---|---|
| GB | 2 331 860 A | 6/1999 |
| GB | 2 417 140 A | 2/2006 |

* cited by examiner

WIND TURBINE WITH SEALED OFF STATOR CHAMBER

BACKGROUND OF THE INVENTION

1. Field of the Invention

The present invention relates to a wind turbine comprising:
a wind turbine tower
a nacelle provided on the wind turbine
a wind turbine rotor hub rotatably mounted at the nacelle, the wind turbine rotor hub having at least one wind turbine blade mounted thereon
a shaft coupled to the wind turbine rotor hub, and
a generator coupled to the shaft, which generator comprises a rotor arranged rotatbly in relation to a stator, which rotor comprises at least one superconducting rotor coil in a rotor chamber encapsulated by a rotor housing, and which stator comprises at least one stator coil of a conducting material, where the stator coil is in a stator chamber encapsulated by a stator housing; the superconducting rotor coil and the stator coil being arranged to have interacting magnetic fields for inducing a current in the stator coil when the rotor is rotated, and with a rotor-stator gap between the rotor housing and the stator housing.

2. Description of Related Art

In this aspect, wind turbines have been used and developed. In recent developments and proposals superconducting generators have been suggested.

Superconductors are typically lighter and smaller than conventional conductors and are therefore attractive for use in wind turbines to reduce either weight or to allow for the generation of larger powers.

One example of such proposal of a superconducting wind turbine is disclosed in U.S. Patent Application Publication 2009/0224550 A1. For practical purposes and operation on-shore as well as off-shore, the disclosed superconducting wind turbine has a number of shortcomings such as the configuration and arrangement of the superconducting rotor coils and coils which is not suited for operational conditions.

Another example of such a super conducting wind turbine is disclosed in U.S. Pat. No. 4,146,804. The configuration discloses a stator assembly and a rotor assembly arranged in a generator housing in which the stator assembly and the rotor assembly are arranged in a stator casing and a rotor casing respectively. The rotor assembly is mounted on two bearings located at the end plates of the generator housing. The stator assembly comprises a plurality of stator coils wounded onto a Micarta bore seal connected to two end plates at the end. This configuration has the drawback that the Micarta plate in the turn end areas may bend outwards towards the rotor assembly or even collapse due to the pumping pressure and the oil pressure. In order to keep the air gap between the rotor casing and the stator casing as small as possible, the rotor assembly is supported by the bearings so that the rotor assembly is stabilised relative to the stator assembly and thereby allowing the air gap to be reduced. However, this support structure adds to the total weight of the generator and increases the production costs.

SUMMARY OF THE INVENTION

An object of this invention is to provide means for overcoming shortcomings of the cited prior art and to allow for the use of superconducting rotor coils in the rotor and stator interaction in a wind turbine to reduce weight and/or size or to allow for larger power output.

An object of this invention is to provide a configuration that allows for the rotor to be based on a superconducting rotor coil arrangement to be operational in a wind turbine.

An object of this invention is to provide a configuration that allows for the stator to be interacting with a rotor based on a superconducting rotor coil arrangement.

An object of this invention is to provide means for cooling of the stator coil arrangement configured to interact with a rotor based on a superconducting rotor coil arrangement.

An object of this invention is to provide a configuration that prevents the stator housing inner shell from bending outwards towards the rotor.

An object of the invention is achieved by a wind turbine characterized in that—the stator housing comprises a stator inner shell facing the rotor housing, wherein the stator inner shell comprises at least one first inner shell element which is arranged between the stator iron and a stator housing end plate.

This allows loads acting on the stator housing inner shell due to the pumping pressure and the static oil pressure in the stator chamber to be absorbed by at least one first inner shell element. The inner shell element may be configured as a thick cylindrical plate of a more than a few millimeters, e.g., between 1 mm and 12 mm, preferably between 1 mm and 6 mm or between 1 mm and 4 mm. The inner shell element is arranged between the stator iron and the stator housing end plate so that the inner peripheries of the inner shell element and the stator iron form a continuous surface. This allows the first and second chambers formed in the stator chamber to be closed off by the inner shell element. The inner shell element may preferably be made from a non-magnetic and/or non-conductive material, such as suitable metals or fiber reinforced plastics or suitable composites where the fibers may be glass, carbon or organic fibers.

In a particular embodiment, the stator housing end plate comprises a recess in which the second inner shell element is placed and wherein a seal is arranged.

This allows the inner shell element to be held in place by the recess without using fastening means. The contact area between the inner shell element and the stator housing end plate may be sealed off using a sealer or an elastic deformable element in the form of an O-ring or another suitable seal. The seal may be made from a high temperature and/or an oil resistant material suitable to be used in oil cooling wind turbine generator.

In a particular embodiment, the stator housing end plate is attached to the inner shell element and a contact area between the stator housing end plate and the inner shell element is sealed off by means of a sealing material.

This allows the inner shell element to be firmly attached to the stator housing end plate by an adhesive or fastening means, such as bolts, screw or other suitable fastening means. The inner shell element may instead be attached to the stator housing end plate by means of welding, soldering or another fastening technique. The contact area may then be sealed off using a suitable sealing material, such as a sealer, an adhesive or a seal through which the fastening means may extend.

In a particular embodiment, at least one pressure plate is arranged on at least one orifice of the stator iron and is connected to a stator housing outer shell and the inner shell element.

The pressure plates allow the inner shell element to be connected to the stator outer shell so that the laminated stack in the stator iron is held firmly in place, thereby preventing peeling in the laminate. The pressure plate, the inner shell element, the stator housing end plate and the stator outer shell define the first and second chambers located in the stator chamber. The pressure plate comprises cut outs for the stator coils and the cooling channels arranged in the stator iron, so that the coolant may flow from one chamber to the other chamber in order to cool the stator coils. The pressure plate may be configured to be connected to the inner shell element and/or the stator outer shell by using fastening means, such as bolts, screws or other suitable fastening means. The pressure plate may instead be welded, soldered or otherwise jointed to the stator outer shell and/or the inner shell element. The pressure plate may be sealed at the ends and/or around the cut outs using a seal, a sealer or another suitable sealing material, so that the oil is prevented from coming into contact with the laminated stack in the stator iron.

In a particular embodiment a torque transferring profile is arranged on a first side of the pressure plate and is connected to the stator housing outer shell and the pressure plate.

The torque transferring profiles allow the introduced torque in the stator iron and the stator coils to be transferred to the stator outer shell. The profiles may be shaped as stiffeners which are connected to the pressure plate and the stator outer shell and extend in a perpendicular direction away from the pressure plate. The connection may be done by welding or soldering or by use of fastening means, such as bolts, screws or other suitable fastening means.

In a particular embodiment, the stator inner shell comprises a second inner shell element which overlaps at least a portion of the first inner shell element, and that the first inner shell element is attached to the second inner shell element in the overlapping area.

The two inner shell elements may be attached to each other, so that the overlapping area functions as a seal between the first and second inner shell elements, thereby omitting the need for sealing off the contact area between the first inner shell element and the orifice of the stator iron. The overlapping area may be sealed off by applying the adhesive to at least a portion of the overlapping area.

Alternatively, a seal in the form of an elastic deformable element arranged in the overlapping area or a sealer may be used to seal off the overlapping area. The second inner shell element may be extended to overlap the entire outer surface of the first inner shell element. This allows the second inner shell element to also be attached and/or sealed to the stator housing end plate. The second inner shell element may preferably be made from a non-magnetic and/or non-conductive material, such as suitable metals or fiber reinforced plastics or suitable composites where the fibers may be glass, carbon or organic fibers. The second inner shell element may be made of a different material, e.g., fiber reinforced plastic/composite, than the first inner shell element, e.g., metal. This configuration allows the use of two inner shell elements having different thermal expansion coefficients. By making the first inner shell element of a non-magnetic and non-conductive material, losses in the generator may be reduced. The first inner shell element may be configured as a thin cylindrical plate of a few millimeters, e.g., between 1 mm and 6 mm, preferably between 1 mm and 3 mm or 2 mm. The thin plate allows the distance between the stator coils and the rotor coils to be reduced, so that the efficiency of the generator may be increased.

In a particular embodiment, the first inner shell element forms a part of the second inner shell element.

This allows the two inner shell elements to be formed as a single element. This may reduce the number of manufacturing step needed to arrange the stator inner shell, but may require a different way of arranging the single element inside the generator. This eliminates the need for attaching and/or sealing the two inner shell elements together.

In a particular embodiment, the second inner shell element is attached to at least one wedge in the stator iron.

This configuration allows the second inner shell element to be attached to at least a part of the wedges holding the stator coils in place, thus preventing the stator inner shell from bending or collapsing towards the rotor assembly. The second inner shell element may be attached by using an adhesive, glue or a bond having strong adhesion properties to the materials of the wedges and of the second inner shell element, so that the stator inner shell remains attached to the stator iron during operation. The adhesive may be a two-component epoxy adhesive, e.g., a two-component epoxy adhesive with strong adhesion properties to fiber reinforced plastics/composites and the selected material or composite of the wedges. The adhesive may have high temperature resistant properties, e.g., to heated oil, such as a high temperature resistant two-component epoxy adhesive (i.e., of the type LORD® 305 from the LORD Corporation) suitable to be used in an oiled cooling wind turbine generator. The second inner shell element may instead be attached using fastening means such as bolts, screws or other suitable fastening means, e.g., made from a non-magnetic and/or non-conductive material (i.e. from plastics or nylon). The adhesive may be placed in a recess formed by two stator teeth and an intermediate wedge. This allows the second inner shell element to be placed in direct contact with the outer side of the stator teeth. The adhesive may be placed on a continuous area formed by the outer surfaces of the stator teeth and the wedges.

In a particular embodiment, the second inner shell element is attached to at least one stator teeth in the stator iron.

This allows the second inner shell element to be attached to at least a part of the stator teeth formed in the stator iron. The second inner shell element may be attached using an adhesive, glue or a bond having strong adhesion properties to the materials of the stator teeth and/or of the second inner shell element, so that the stator inner shell remains attached to the stator iron during operation. The adhesive may be a two-component epoxy adhesive, e.g., a two-component epoxy adhesive with strong adhesion properties to metal and/or to fiber reinforced plastics/composites. The adhesive may have high temperature resistant properties, e.g., to heated oil, such as a high temperature resistant two-component epoxy adhesive (i.e., of the type LORD® 305 from the LORD Corporation) suitable to be used in an oiled cooling wind turbine generator. The first inner shell element may instead attached to the stator teeth using fastening means such as bolts, screws or other suitable fastening means, e.g., made from a non-magnetic and/or non-conductive material (i.e., from plastics or nylon).

In a particular embodiment, at least one of the inner shell elements comprises at least one rib or protrusion arranged on an inner side facing away from the rotor assembly.

This allows the stator inner shell to be outfitted with a plurality of ribs configured to reinforce the stator inner shell, so that it does not bend or collapse towards the rotor assembly. The ribs may be formed as protrusions arranged on the inner surface of at least one of the two elements, e.g., the first inner shell element. If the ribs are arranged on the second inner shell element, the inner periphery of the stator iron may comprise a plurality of recesses configured to receive and hold the protrusions. The ribs may be formed as ribs extending in a perpendicular direction relative to the axial direction of the stator coils or as one or more helically shaped ribs. This allows the thickness of the first inner shell element to be reduced or allows the first inner shell element to be omitted since the ribs may be configured to absorb the loads applied due to the pumping pressure and the static oil pressure. This also allows the second inner shell element to be attached to the stator iron by means of the ribs/protrusions, so that the adhesive or fastening means may be omitted.

Thereby, the stator coil and the rotor coils are separated in each of their housing in which the environment, such as temperature, pressure or other conditions can be adjusted fully, or to a larger degree, independently of each other.

By encapsulation is understood a shell, a cover or a housing which forms a capsule around an object. The object can be the rotor coils and auxiliary equipment in vicinity of the rotor coils and the shaft. Rotor auxiliaries include bearings, rotor support structures, cables, etc.

The object can be the stator coils and auxiliary equipment in vicinity of the stator coil. Stator auxiliaries include stator iron, stator support structure, cables, etc.

A further advantage of the encapsulation is that the rotor can be assembled in a clean environment, transported and installed as one unit without or with reduced risk of being contaminated by e.g., moist or even worse salted moist.

Likewise, the encapsulation of the stator provides the same advantages.

During installation of the wind turbine, the rotor housing and the stator housing are placed and adjusted according to markings on the rotor housing and the stator housing.

Hence, the rotor and the stator can be adjusted and balanced in a test bed before being transported individually and can be easily be installed and re-placed relative to each other in a wind turbine, even under harsh conditions such as offshore.

In a particular embodiment, the rotor housing is cylindrically shaped and surrounds the shaft and is closed by endplates at either ends.

In a particular embodiment, the stator housing is cylindrically shaped with an outer and an inner cylinder, where the inner cylinder surrounds the rotor housing allowing for an air gap between the rotor housing and the stator housing. The inner and outer cylinders are closed by ring-shaped endplates at the ends, and thereby forming a stator chamber.

The stator housing is configured with connection means for connecting the inside with the outside of the stator housing.

Connection means includes means for connecting a power cable, a communication cable, a diagnostic cable, a conduit from the inside to the outside.

In an embodiment, the air gap is a vacuum. The vacuum can be achieved by sealing off the space between the rotor housing and the stator housing at either ends and by connecting a vacuum pump to the air gap.

By superconducting is meant a state of a conductor where the resistivity of the conductor is zero, which happens when the temperature is below a critical temperature T.

Depending on the choice of the material of the superconductor, the critical temperature will vary. Likewise, the limitations of the means for cooling and maintaining a certain temperature determine a series of materials that will be superconducting at those temperatures.

The person skilled in the art will be able, from standard textbooks, to make choices.

The person skilled in the art can choose a High Temperature Superconducting (HTS) material and on this basis will know to provide a temperature above 30° K. At upper end, the HTS is presently at about 150° K.

One such HTS-material is Y—Ba—Cu—O which is superconducting at Tc>77° K which is the boiling point of liquid nitrogen.

Another HTS-material is Bi—Sr—Ca—Cu—O which is superconducting at different critical temperatures (20° K, 85° K, and 120° K).

Another HTS-material is Tl—Ba—Ca—Cu—O which is superconducting at different critical temperatures between 80° K and 125° K.

Another HTS-material is Hg—Ba—Ca—Cu—O which is superconducting at different critical temperatures between 94° K and 134° K.

According to an embodiment, the superconducting rotor coil is chosen based on a temperature which is maintainable by using coolants with low boiling points. In particular, the boiling point of liquid nitrogen, 77° K, the boiling points of liquid hydrogen, 20° K, and the boiling point of liquid helium, 4.2° K.

As a starting point, the person of ordinary skill in the art will use a table as follows to determine the class of materials in order to provide a cooling system that will maintain an operating temperature based on a particular boiling point.

| Tc [K] | Material | Class |
|--------|----------|-------|
| 133 | $HgBa_2Ca_2Cu_3O_x$ | Copper-oxide superconductors |
| 110 | $Bi_2Sr_2Ca_2Cu_3O_{10}$ (BSCCO) | |
| 90 | $YBa_2Cu_3O_7$ (YBCO) | |
| 77 | Boiling point of liquid nitrogen | |
| 55 | SmFeAs (O,F) | Iron-based superconductors |
| 41 | CeFeAs (O,F) | |
| 26 | LaFeAs (O,F) | |
| 20 | Boiling point of liquid hydrogen | |
| 18 | $Nb_3Sn$ | Metallic low-temperature superconductors |
| 10 | NbTi | |
| 9.2 | Nb | |
| 4.2 | Boiling point of liquid helium | |
| 4.2 | Hg | Metallic low-temperature superconductors |

According to an embodiment, the rotor housing is configured to have a temperature which is below the critical temperature for the particular superconductor.

According to an embodiment, the rotor housing is configured to house a high temperature superconductor (HTS).

A person skilled in the art will seek guidance to make such housing depending on the temperature needed according to the required temperatures given herein.

In the case of using liquid nitrogen, the rotor housing will be configured to handle liquid nitrogen.

The stator housing is preferably a non-magnetic material.

According to an embodiment, the wind turbine is special in that the stator chamber is at least partially filled with a coolant that is thermally coupled to a stator coil.

Thereby, the stator coils can be cooled by the coolant and the risk of hotspots occurring is reduced or eliminated.

In an embodiment, the coolant is thermally coupled to the stator housing, thereby heat is conducted from the coolant to the stator housing. In a particular embodiment, the outer surface of the stator housing is made with a cooling means. One way to achieve cooling means is by having a larger surface area.

According to an embodiment, the wind turbine is special in that at least one said stator coil is hollow, has a recess, or has a channel.

Thereby material is saved and the stator coil will have a larger area for thermally coupling to the coolant. Furthermore, the stronger magnetic field, than that from a conventional rotor, from the superconducting rotor allows for leaving out coil irons in the stator.

The hollow part, the recess part, or the channel of the stator coil is prepared to thermally couple to the coolant.

According to an embodiment, the wind turbine is special in that the coolant is an anticorrosive, or a lubricant, or both an anticorrosive and a lubricant such as an oil, and in particular a transformer oil.

Thereby, the stator will be cooled and corrosion is reduced or even eliminated.

According to an embodiment, the wind turbine is special in that the stator chamber is connected to a stator cooling system and configured to circulate the coolant.

In an embodiment, the cooling system has a cooling pump for circulating the coolant via a conduit to a cooling fan and back.

In an embodiment, the cooling fan is replaced or supplemented by a cooling plate.

Thereby, heat can be transferred from the stator coils to maintain the temperature of the stator coils below a certain temperature during operation.

The stator cooling system is configured to maintain a temperature in a temperature interval when idle. The temperature range is between 260 K and 320 K, preferably between 275° K and 300° K.

The stator cooling system is configured to maintain a certain temperature during start-up of operation. The temperature range is between 275K and 600K; and preferably between 275° K and 475° K.

The stator cooling system is configured to maintain a certain temperature during start-up of operation. The temperature range is between 275° K and 600° K, preferably between 350° K and 385° K, and most preferably about 373° K.

According to an embodiment, the wind turbine is special in that the rotor housing is connected to a rotor cooling system in order to cool a superconducting rotor coil to a superconducting state in the rotor chamber.

The rotor cooling system is a cryostat capable of obtaining a temperature in the temperature range between 2° K and 325° K.

According to an embodiment, the wind turbine is special in that the rotor cooling system cools the superconducting rotor coil to a temperature between 4K and 120K, between 25K and 80K, or between 25° K and 35° K.

The rotor cooling system is configured to maintain a temperature in a temperature interval when idle. The temperature range is between 260° K and 320° K, preferably between 275° K and 300° K.

The rotor cooling system is configured to maintain a certain temperature during start-up of operation. The temperature range is between 275° K and 600° K, preferably between 275° K and 475° K.

According to a particular embodiment, the rotor cooling system is based on liquid nitrogen to maintain a temperature below 77° K which is the boiling point of liquid nitrogen.

According to an embodiment, the wind turbine is special in that the rotor housing and the stator housing is in a generator chamber enclosed by a generator housing.

Thereby, stable operating conditions can be achieved by controlling the environment in the generator chamber allowing the rotor chamber to be controlled more independently and the stator chamber to be controlled more independently.

In an embodiment, the generator housing encloses possible emissions, leaks or exhausts from either the rotor chamber or the stator chamber.

In an embodiment, the generator housing has a pressure that is higher than the pressures in the stator housing and the rotor housing.

According to an embodiment, the wind turbine is special in that the generator chamber is a vacuum.

Thereby, the stator housing and the rotor housing are thermally de-coupled or at least the thermal coupling is minimized.

An object of the invention is also achieved by a wind turbine as disclosed, but wherein the stator is a rotor and said rotor is a stator. This means that the superconducting coils are stationary and the conventionally conducting coils are rotating.

The invention is described by example only and with reference to the accompanying drawings.

DETAILED DESCRIPTION OF THE INVENTION

Figure 1:
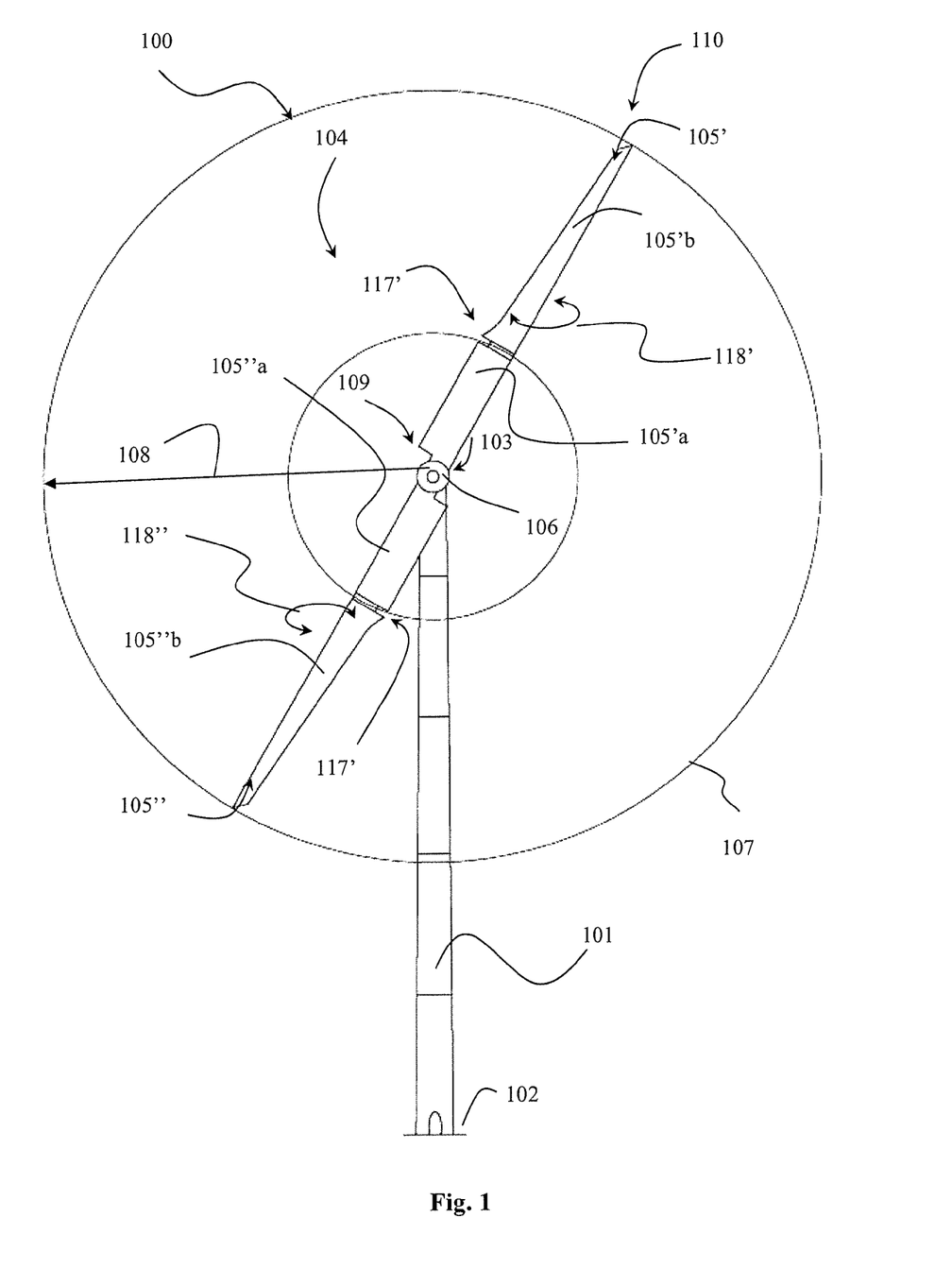
FIG. 1 shows a wind turbine.

FIG. 1 shows a wind turbine 100. The wind turbine 100 has a tower 101 that is configured to raise from a foundation 102 and which tower 101 has a nacelle 103 mounted. The wind turbine 101 has a wind turbine rotor 104 with at least one blade 105, in this case two blades 105', 105". In the illustrated embodiment, the wind turbine 100 is a partial pitch wind turbine, but it could be any type of wind turbine.

The wind turbine rotor 104 includes the blades 105 that are mounted in a hub 106, so that the rotor 104 can rotate and circumscribe a rotor circle 107 with a rotor radius that is equivalent to the blade lengths 108.

Each blade 105 has a mounted end 109 or an inner end for mounting the blade 105 at the hub 105, and opposite a free end 109 or an outer end.

The rotor 103 rotates in a rotational plane 113 around an axis 114 that is extended in a shaft 115 (not shown in this figure) connected to a generator 116 (not shown in this figure).

A blade 105 on a partial pitch wind turbine 100 comprises an inner blade section 105a towards the hub 106 and an outer blade section 105b towards the outer end 110. The inner blade section 105a and the outer blade section 105b are parted by the pitching system 117 regulating the pitching angle 118.

Figure 2:
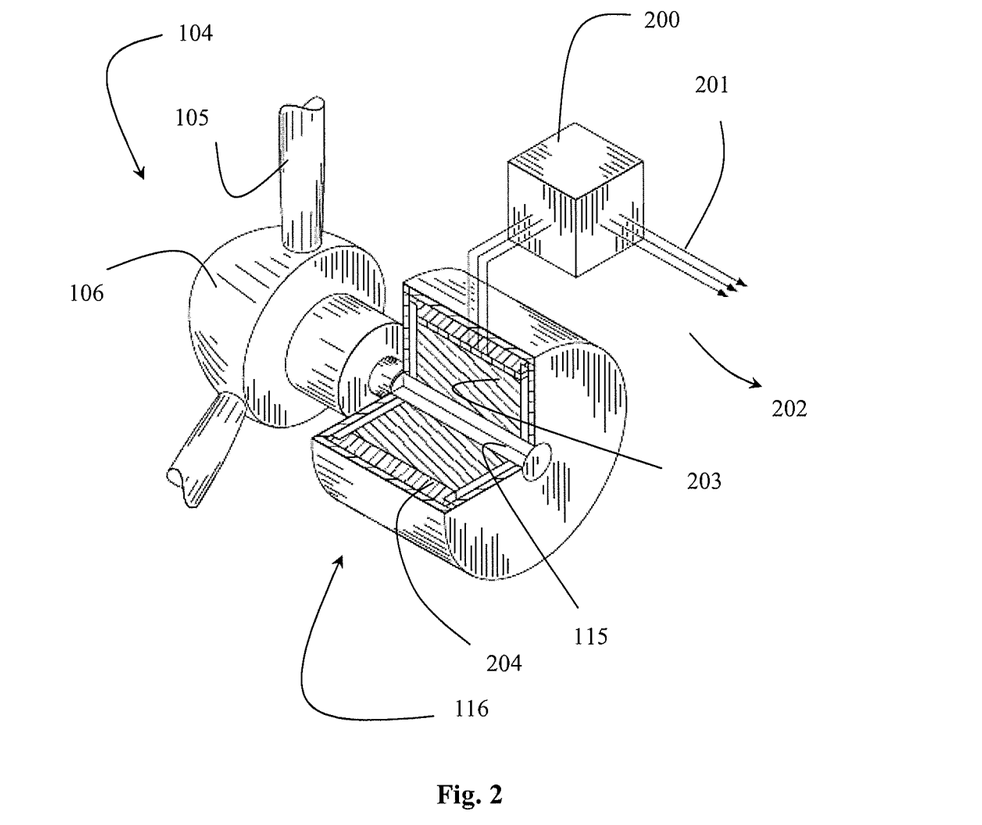
FIG. 2 shows a hub and a view of the generator and the connection to the grid.

FIG. 2 illustrates a schematic view of a part of a wind turbine with a wind turbine rotor 104 with blades 105 on a hub 106 that is extended via a shaft 115 for transferring mechanical energy to a generator 116 that converts mechanical energy to electrical energy.

The generator 116 is connected to a converter 200 that via power lines 201 delivers the produced electrical energy to a grid 202.

The converter 200 is configured to match the wind turbine to the grid 202 according to given grid codes or as a stand alone unit. It is understood by the person skilled in the art to configure the converter 200, so that the wind turbine generator 116 delivers power within the specifications given by a particular grid code. It is also understood that the person skilled in the art will be able to configure the converter 200 to provide the correct brake torque to the generator 116 as required to prevent over speed of the wind turbine rotor 104. The generator 116 is configured with a rotor 203 which is the generator rotor that is substantially rigidly connected to the shaft 115 and arranged for rotating within a stator 204, so that the mechanical energy will be converted to electrical energy due to an electromagnetically interaction between the rotor 203 and the stator 204 due to electromagnetically means provided for in the rotor 203 and the stator 204 as will be disclosed.

Figure 3:
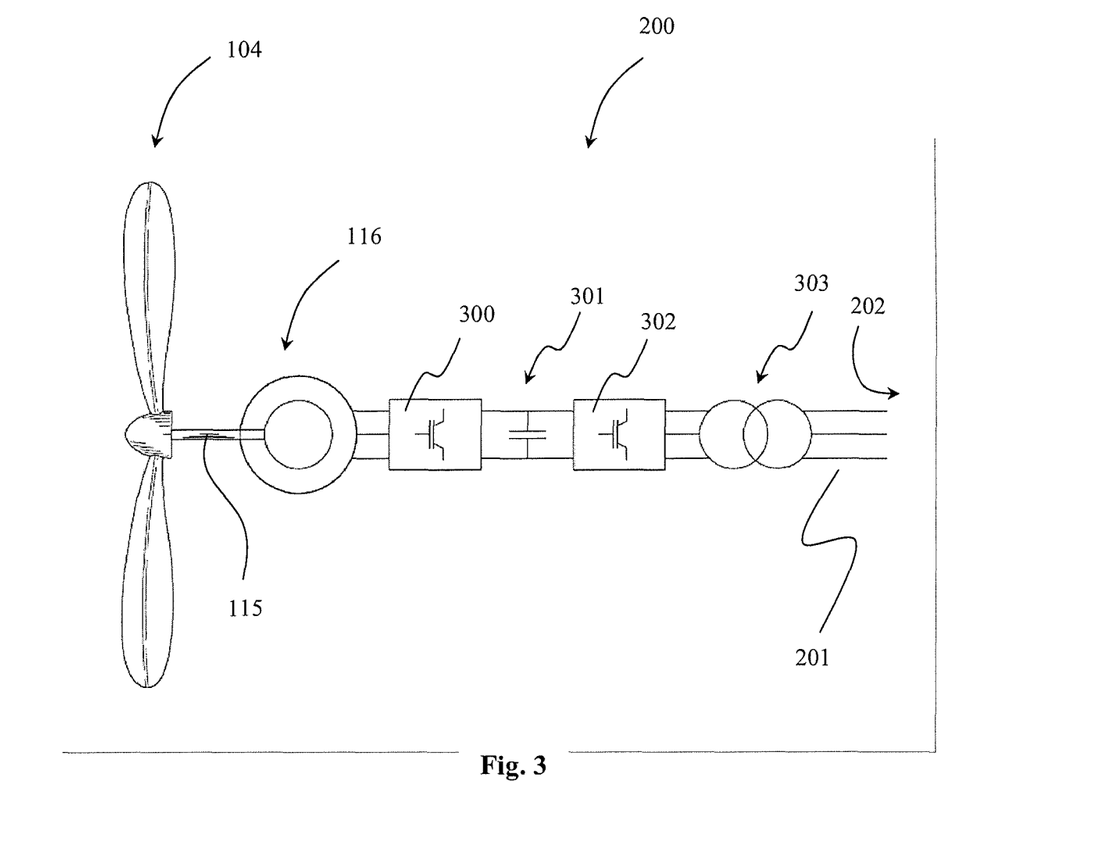
FIG. 3 shows a schematic layout of a wind turbine rotor, a generator, a converter configuration, a transformer and a power line connection to the grid.

FIG. 3 shows an embodiment of a wind turbine rotor 104 connected via a shaft 115 to a generator 116 which is connected to the grid 202 via a converter 200 and power lines 201. The converter 200 comprises a generator side converter 300, a brake chopper 301 and a grid side converter 302.

In the embodiment, there is a transformer 303 between the grid side converter 302 and the grid 201.

The brake chopper 301 is configured to regulate the speed of the wind turbine rotor 104 and in particular to avoid over speeding. The regulation is performed according to a particular grid code according to the particular grid.

In an embodiment, the brake chopper 301 includes an arrangement of resistors, capacitors and power circuitry arranged to absorb power and to provide a torque to generator 116 and hence to the wind turbine rotor 104 via the shaft 115.

Figure 4:
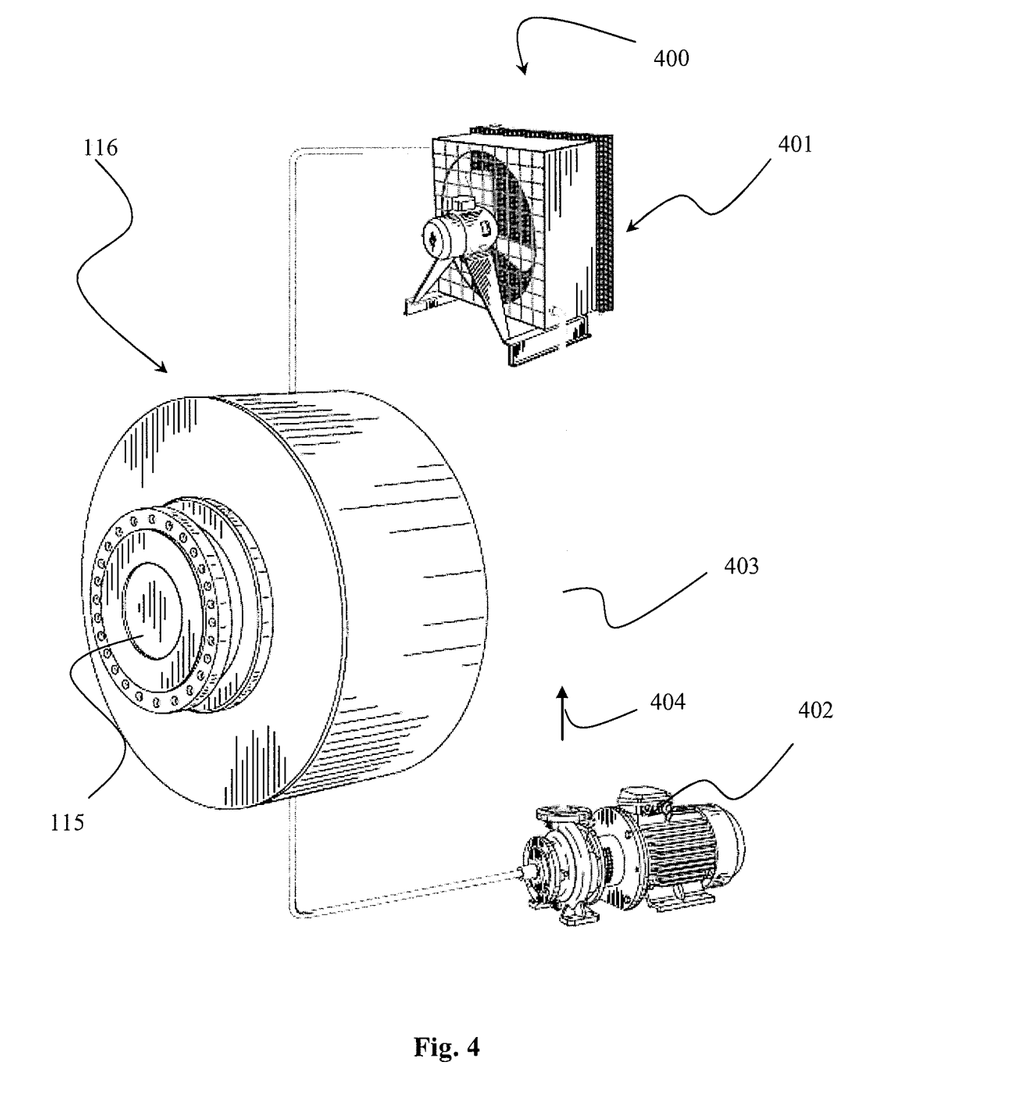
FIG. 4 shows a generator and a stator cooling system.

FIG. 4 shows an embodiment of a stator cooling system 400 to a generator 116 with connection means to a shaft 115.

The stator cooling system 400 includes cooling fan 401 connected to a cooling pump 402 via a conduit 403 all configured to circulate a coolant 404 through the generator 116, thereby cooling the generator 116.

In particular, the stator cooling system 400 is configured to cool the stator 204 as will be exemplified in the following.

Figure 5:
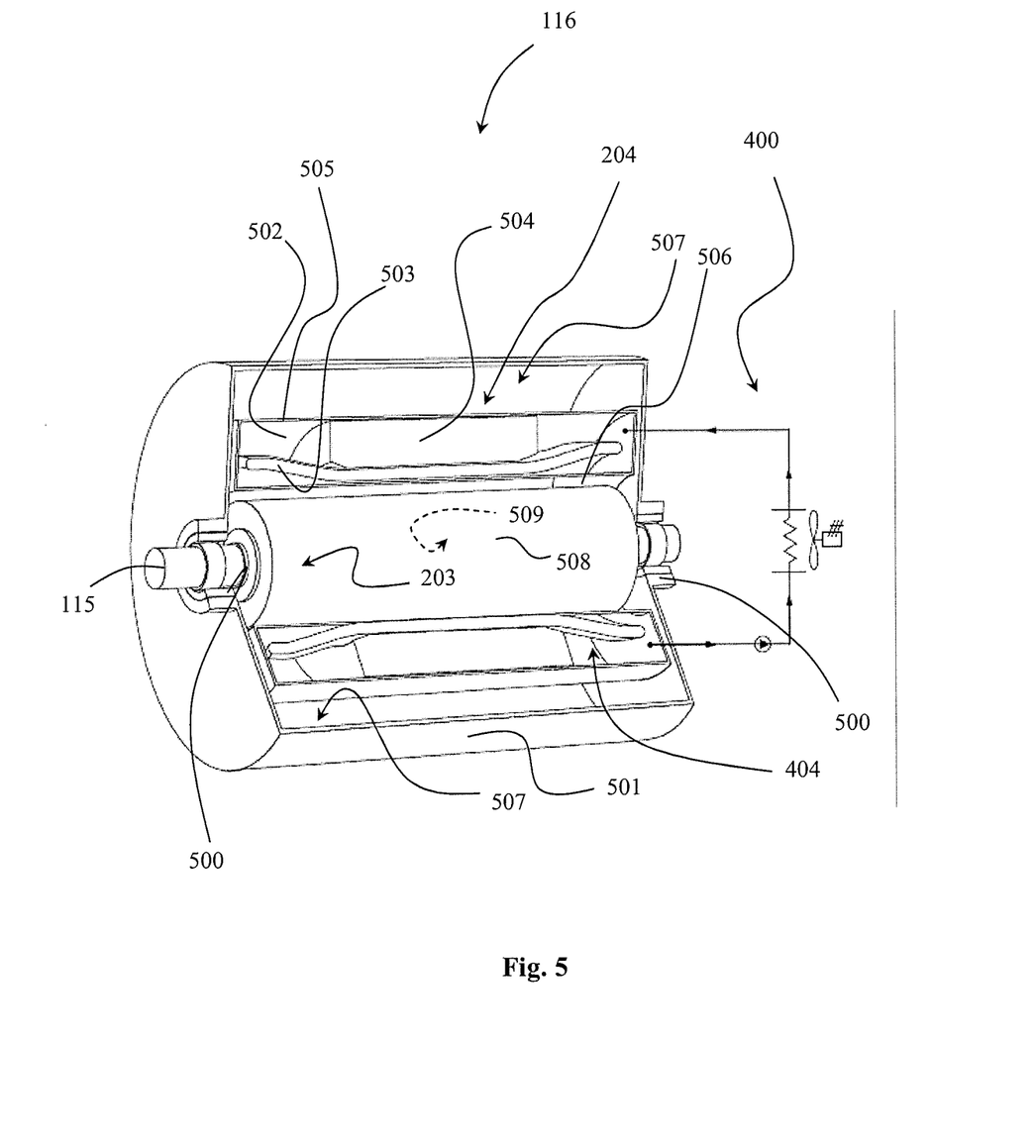
FIG. 5 shows partial cross sectional view of a first embodiment of a generator with a rotor with a rotor housing enclosing at least a superconducting rotor coil.

FIG. 5 shows a partial cross sectional view of a first embodiment of a generator 116 that is a super conducting generator.

In the embodiment, there is a shaft 115 which essentially extends essentially centrally through the generator 116.

The shaft 115 is connected to the rotor 203 of the generator and supported in at least one bearing 500.

The generator 116 comprises a generator housing 501 that encloses elements in the generator and allows the shaft 115 to rotate in the bearings 500.

The generator 116 has a stator 204 comprising a stator chamber 502 in which there are stator coils 503 and a stator iron 504 or stator yoke. The stator chamber 502 is defined by a stator housing 505 that is located around the rotor 203 enclosing the stator coils 503 and the stator iron 504 in the stator chamber 502 and at the same surrounding the rotor 203.

Between the stator housing 505 and the rotor 203 there is a rotor-stator gap 506.

The generator housing 501 encloses the stator housing 505 and the rotor 203 and defines a generator chamber 507.

The rotor 203 comprises elements that are enclosed by a rotor housing 503 that defines a rotor chamber 509.

The generator housing 501 encloses the stator housing 505 that surrounds the rotor housing 508 in such a way that the shaft 115 can rotate the rotor 203 inside the stator 204. In one embodiment, the rotor housing 508 is stationary in relation to the stator 204. In another embodiment, the rotor housing 508 rotates with the rotor 203 in relation to the stator 204.

In this embodiment, the stator cooling system 400 is connected to the stator chamber 504 that is at least partially filled with a coolant 404.

In this embodiment, the rotor housing 508 is configured to maintain the rotor chamber 509 to conditions capable of housing a superconductor which superconductor can be a high temperature superconductor (HTS). In particular, the rotor housing 508 is configured to house low temperature or cryogenic temperatures required to provide superconducting conditions. In one example the configuration is for liquid nitrogen. In another example the configuration is for liquid helium.

In this embodiment, the rotor-stator gap 506 is part of the generator chamber 509. In this embodiment, the generator chamber is a vacuum.

Figure 6:
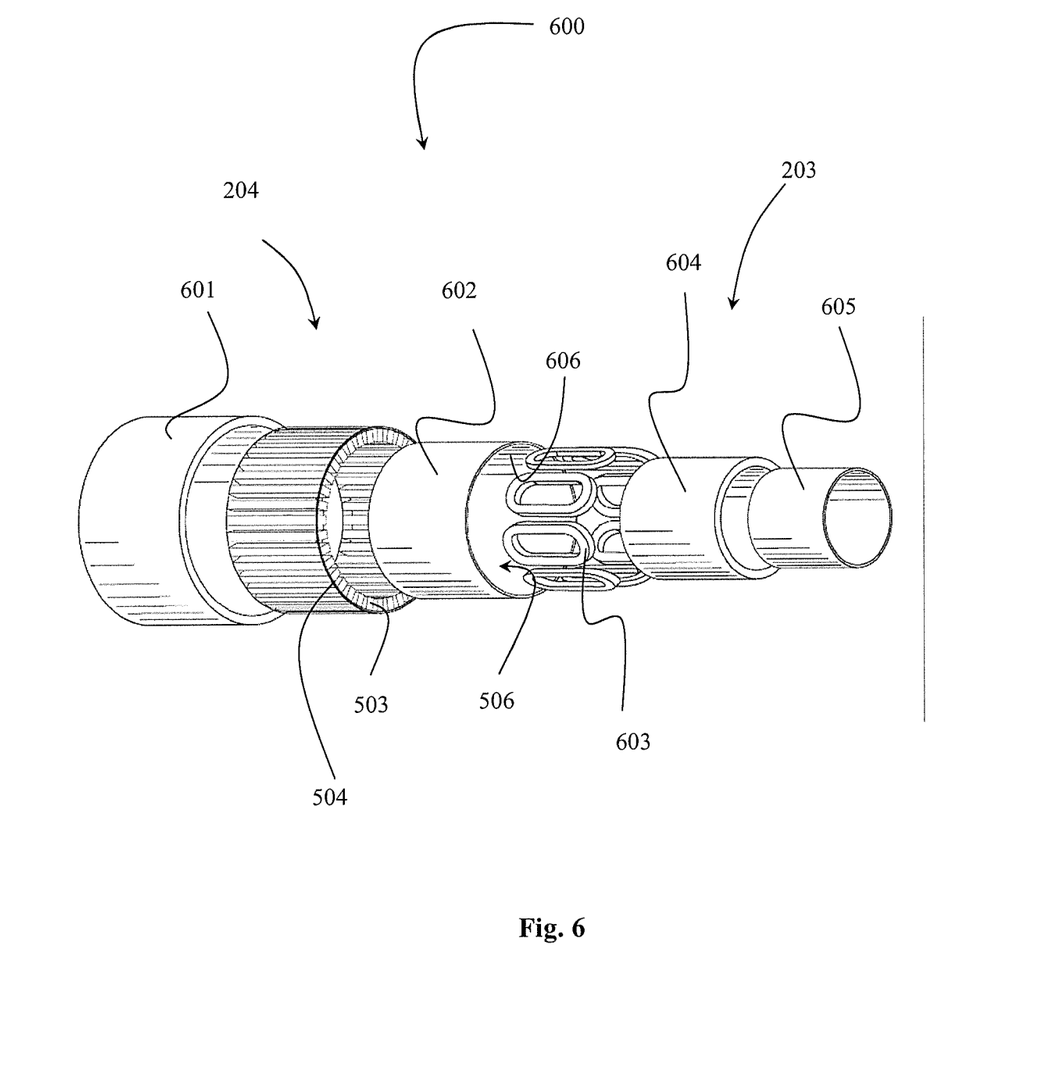
FIG. 6 shows a schematic and exploded view of a stator and rotor arrangement, where the rotor comprises an arrangement of superconducting rotor coils.

FIG. 6 shows a schematic and exploded view of a superconducting generator 600 comprising a stator 204 arrangement and a rotor 203 arrangement. The arrangement is layered for surrounding a shaft 115 (not shown in the figure).

Starting from the outside there is a stator housing outer shell 601 surrounding the stator coils 503 shown with a structural element that functions as a stator iron 504. This surrounds a stator housing inner shell 602. The outer and inner shells 601, 602 can be closed at each end to form the stator chamber 502.

The stator housing inner shell 602 surrounds a set of superconducting rotor coils 603 arranged around a rotor support 604, again surrounding a structure functioning as a rotor iron 605.

In this particular embodiment, the stator housing inner shell 602 has an outer side facing the stator coils 503 and an inner side facing the superconducting rotor coils 603. In this embodiment, the stator housing inner shell 602 is part of the same structural element as a rotor housing outer shell 606.

Figure 7:
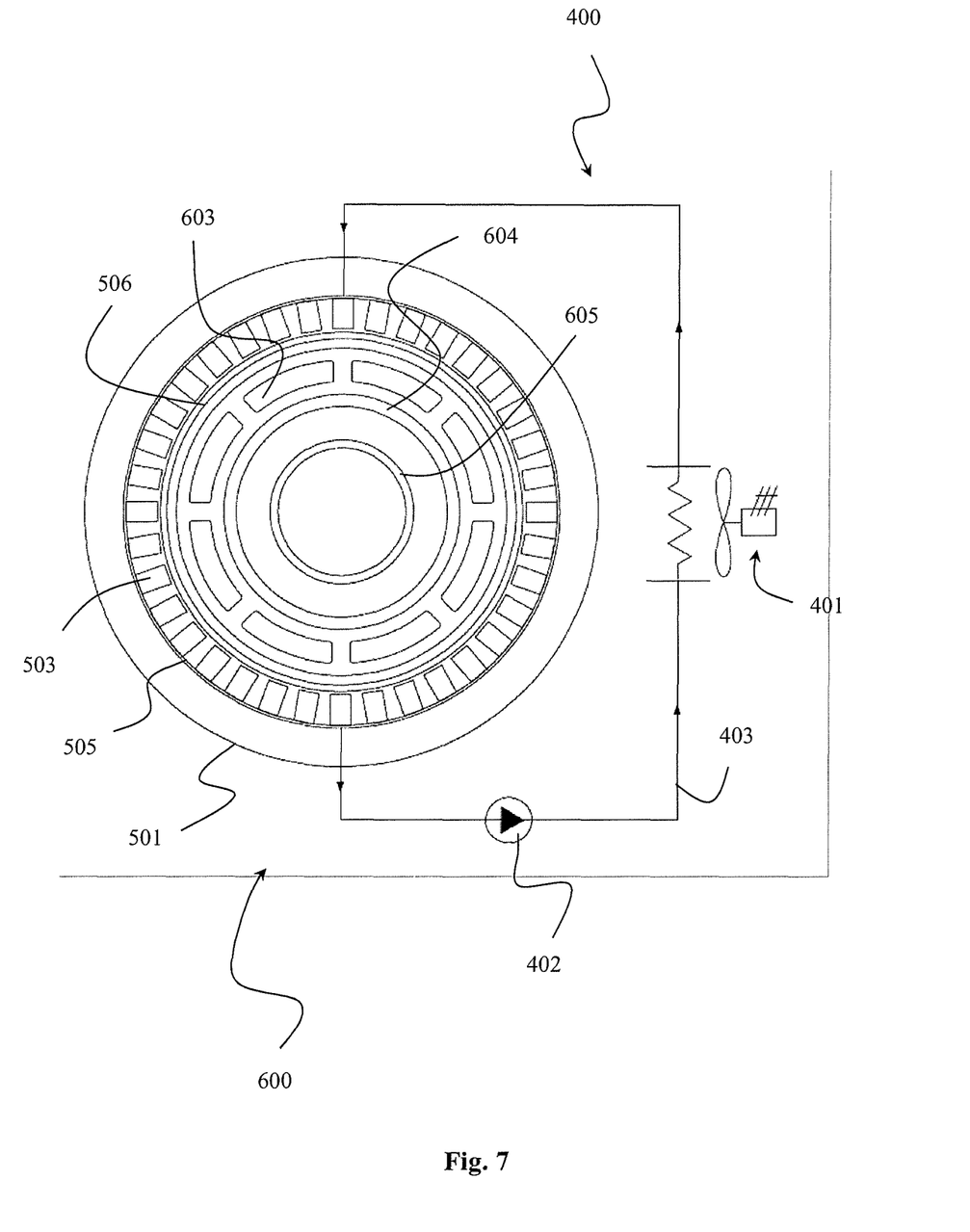
FIG. 7 shows a cross section of a generator with a generator housing, a stator housing with a stator coil arrangement, and a rotor housing with a superconducting rotor coil arrangement.

FIG. 7 shows a cross section of a superconducting generator 600 with a generator housing 501, a stator housing 505 with a stator coil 503 arrangement, and a rotor housing 508 with a superconducting rotor coil 603 arrangement. The stator coil 503 arrangement is supported by a stator iron 504 support.

Between the stator housing 505 and the rotor housing 508 there is the rotor-stator gap 506.

Finally at the innermost the rotor support 604 and the structural element are functioning as the rotor iron 605 leave room for the shaft 115 (not shown in the figure).

Furthermore, a stator cooling system 400 for circulating a coolant 404 between the stator coils 503. The stator cooling system 400 includes a conduit 403 connected to the stator chamber 502 to circulate the coolant 404 by means of a cooling pump 402 by a cooling fan 401 for cooling the stator coils.

Figure 8:
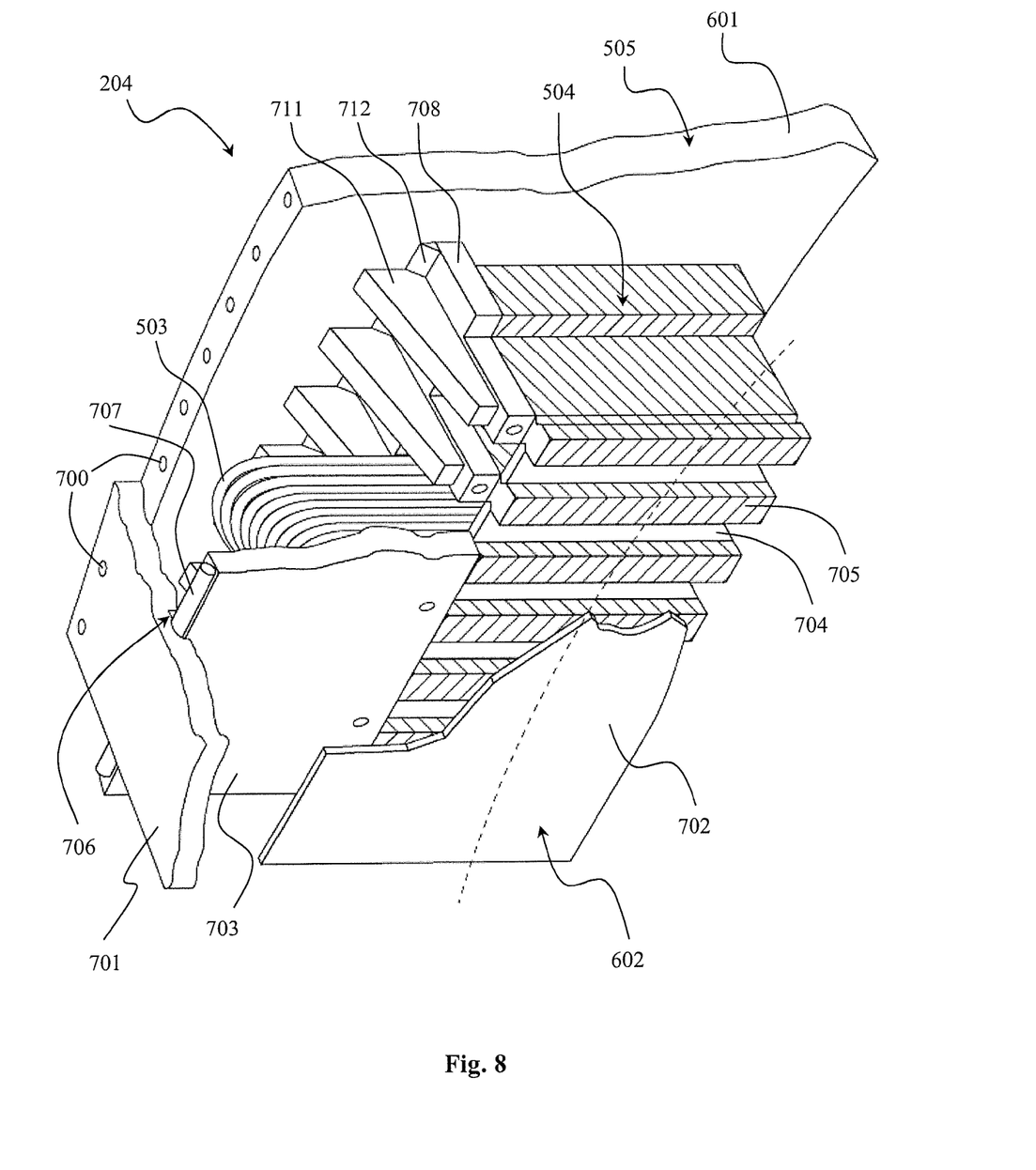
FIG. 8 shows a perspective cutaway view of a second embodiment of an end portion of the stator.

FIG. 8 shows a perspective cutaway view of a second embodiment of an end portion of the stator 204. The stator inner shell 602 and the stator outer shell 601 are connected to each end by a stator housing end plate 700, so that the stator housing 505 is closed off. The stator end plate 700 is attached to the stator outer shell 601 by use of fastening means 701 in the form of bolts or screws. The stator housing 505 defines the stator chamber 502 in which the stator iron 504 and the stator coils 503 are arranged. The stator housing outer shell 601 may be formed as a stator back iron or an outer frame surrounding the stator iron 504.

The stator inner shell 602 comprises a first inner shell element 702 and a second inner shell element 703. The first inner shell element 702 forms a plate having the same structural shape as the rotor housing outer shell 606. The first inner shell element 702 has an outer side facing the rotor housing outer shell 606 and an inner side facing the stator iron 504. The second inner shell element 703 is arranged between the stator housing end plate 700 and the stator iron 504. The second inner shell element 703 has an inner diameter equal to the inner diameter of an inner periphery of the stator iron 504. The second inner shell element 703 has a first end facing the stator housing end plate 700 and a second end facing the stator iron 504. The first inner shell element 702 extends over at least a portion of an outer side of the second inner shell element 703 where the outer side faces the rotor housing outer shell 606.

A plurality of recesses are formed in the inner periphery of the stator iron 504 in which the stator coils 503 are located, as shown in the figure. The stator coils 503 form a plurality of loops extending out of the recesses and into a first chamber and a second chamber defined by the stator iron 504 and the stator housing 505, as shown in FIG. 6 and FIG. 8. The stator coils 503 are held in place by a plurality of wedges 704 located in the recesses. The wedges 704 have a first free end facing a first stator tooth 705 and a second free end facing a second stator tooth 705, where the stator teeth 705 are formed by the recesses. The ends of the wedge 704 may be placed in a recess or track formed in the side surfaces of the stator teeth 705, as shown in the figure. The wedges 704 have an outer side facing the rotor housing outer shell 606 and an inner side facing the stator coils 503. The wedges 704 are made of a magnetic or non-magnetic material/composite having a high gluing or bonding capacity to the first inner shell element 702.

The first inner shell element 702 is attached to the inner periphery of the stator iron 504 by means of an adhesive. In this embodiment, the wedges 704 are positioned in a retracted position in the recesses, so that they form a plurality of small recesses in the inner periphery of the stator iron 504 which is then filled up with the adhesive. In this embodiment, the first inner shell element 702 only contacts the free ends of the stator teeth 705. The adhesive may be applied to at least a portion of the contact area between the first inner shell element 702 and the stator teeth 705. The first inner shell element 702 may be attached to the outer side of the second inner shell element 703 by means of the adhesive.

The stator housing end plate 700 comprises a recess 706 in which the first end of the second inner shell element 703 is placed. A seal 707 in the form of an elastic O-ring may be arranged in the recess, so that the first end of the second inner shell element 703 is sealed off. The second end of the second inner shell element 703 may be arranged near the orifice of the stator iron 504 or in contact with the orifice. The second end is configured so that it may be attached to a plurality of pressure plates 708 by use of fastening means 709 in the form of bolts or screws.

The pressure plates 708 are arranged at the orifices of the stator iron 504 and extend over at least a portion of the orifice. The pressure plate 708 is arranged between the stator housing outer shell 601 and the second inner shell element 703. The pressure plate 708 is at one end configured to be attached to the second inner shell element 703 and at the other end configured to be attached to the stator housing outer shell 601 by use of fastening means in the form of bolts or screws. The stator iron 504 comprises a stack 710 of individual plates laminated together to form the stator iron 504. The pressure plates 708 are configured to hold the laminated stack 710 in plate during operation. The pressure plate 708 comprises a first side facing the stator iron 504 and a second side facing the stator housing end plate 700. The first and second chamber are defined by the pressure plate 708, the second inner shell element 703, the stator housing end plate 701 and the stator outer shell 601.

A torque transferring profile 711 is arranged on the second side of the pressure plate 708. The torque transferring profile 711 is formed as a stiffener plate contacting both the second side of the pressure plate 708 and an inner side of the stator housing outer shell 601. The torque transferring profile may be attached to both the pressure plate 708 and the stator housing outer shell 601. A seal 712 is arranged along or in the contact area between the pressure plate 708 and the stator housing outer shell 601 and optionally also the second inner shell element 703, so that at least the contact area between the pressure plate 708 and the stator housing outer shell 601 is sealed off.

Figure 9:
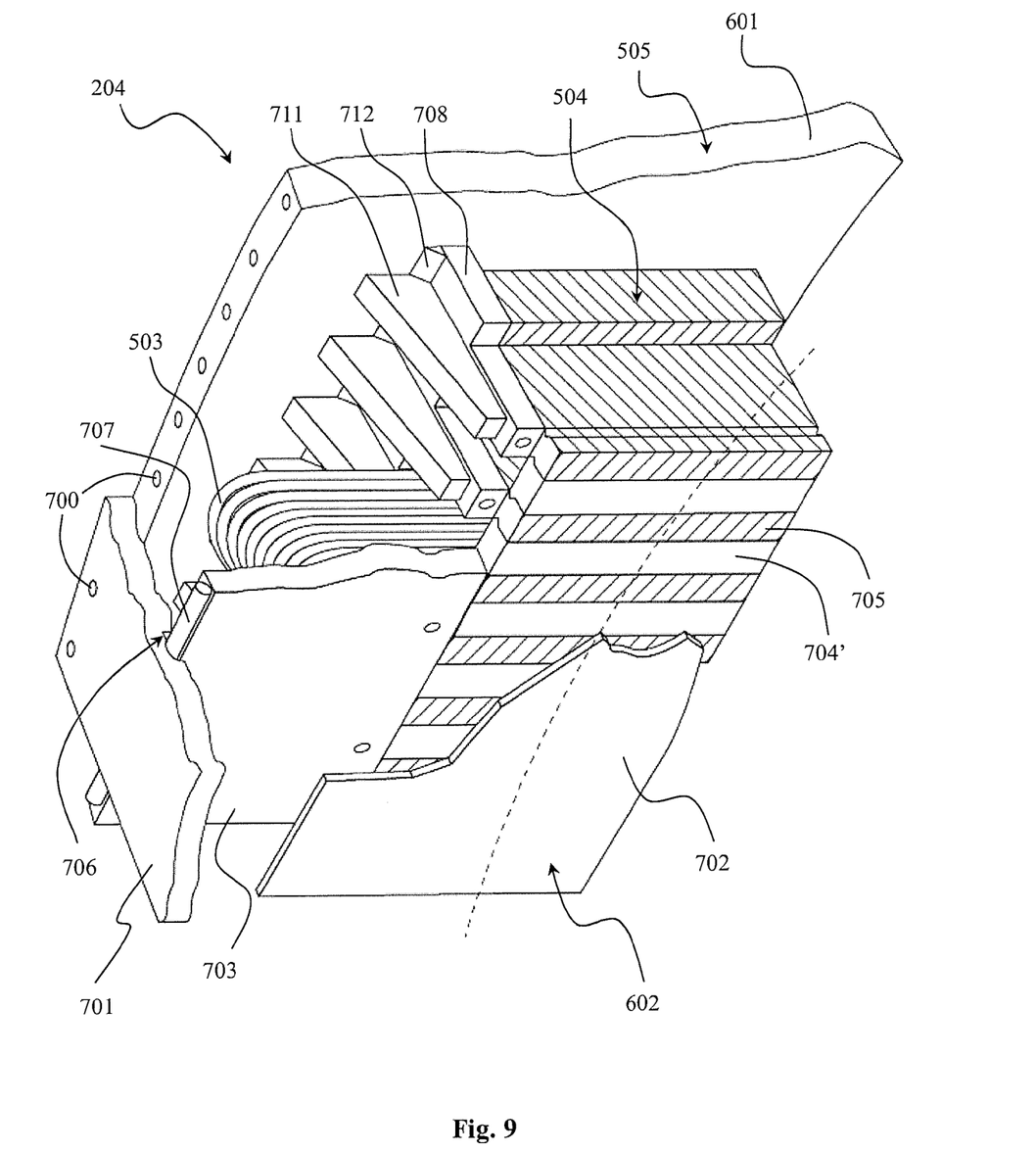
FIG. 9 shows a perspective cutaway view of a third embodiment of the end portion of the stator.

FIG. 9 shows a perspective cutaway view of a third embodiment of the end portion of the stator 204. This embodiment differs from the embodiment shown in FIG. 8 in that the wedge 704' has a different configuration. The wedge 704' is in this embodiment aligned with the free end of the stator teeth 705, so that they form a continuous surface or contact area to which the first inner shell element 702 is attached. The thickness of the wedge 704' may be greater than the thickness of the wedge 704 shown in FIG. 8. The adhesive is then applied to at least the outer side of the wedges 704 before attaching the first inner shell element 702. The inner shell element 702 may be attached to the outer side of the second inner shell element 703 by means of the adhesive.

Figure 10:
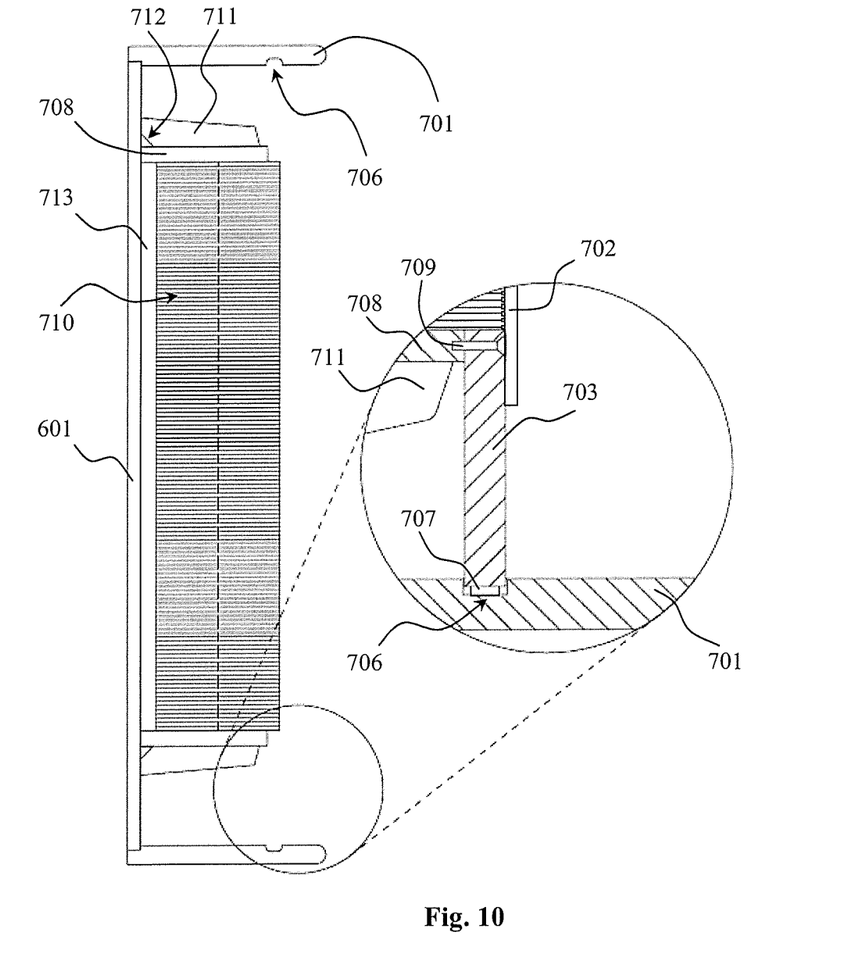
FIG. 10 shows a longitudinal cross sectional view of the stator arrangement shown in FIG. 8 with an enlarged image of a part of the end portion.

FIG. 10 shows a longitudinal cross sectional view of the stator arrangement shown in FIG. 8 with an enlarged image of a part of the end portion. The first inner shell element 702 is only illustrated in the enlarged image.

The stator chamber 502 is separated into the first chamber and the second chamber by the stator iron 504. The two chambers are configured to be at least partially filled with the coolant 404 supplied by cooling pump 402. The two chambers are in fluid communication with each other via at least one type of cooling channel 713. One or more cooling channels 713 are arranged in an outer periphery of the stator iron 504 and/or adjacent to or in the stator coils 503. The cooling channels 713 are in fluid communication with the conduit 403 via at least one of the two chambers.

The second inner shell element 703 is arranged at both ends of the stator housing 505; only one of the two second inner shell elements 703 is shown. The first chamber and the second chamber are defined by the stator housing outer shell 601, the two stator housing end plates 701, the stator iron 504 and the two second inner shell elements 703. The first inner shell element 702 extends over at least a portion of the two second inner shell elements 703. The first inner shell element 702 is attached to at least one of the second inner shell elements 703. The pressure plates 708 and the torque transferring profiles 711 are arranged at the orifices of the stator iron 504 in both chambers.

| No | Part |
|---|---|
| 100 | Wind turbine |
| 101 | Tower |
| 102 | Foundation |
| 103 | Nacelle |
| 104 | Wind turbine rotor |
| 105 | Blade |
| 106 | Hub |
| 107 | Rotor circle |
| 108 | Blade length/rotor radius |
| 109 | Mounted end/inner end |

-continued

| No | Part |
|---|---|
| 110 | Free end/outer end |
| 111 | Blade weight |
| 112 | Rotor weight |
| 113 | Rotational plane |
| 114 | Axis |
| 115 | Shaft |
| 116 | Generator |
| 117 | Pitching system |
| 118 | Pitching angle |
| 200 | Converter |
| 201 | Power lines |
| 202 | Grid |
| 203 | Rotor/generator rotor |
| 204 | Stator |
| 300 | Generator side converter |
| 301 | Brake chopper |
| 302 | Grid side converter |
| 303 | Transfouner |
| 400 | Stator cooling system |
| 401 | Cooling fan |
| 402 | Cooling pump |
| 403 | Conduit |
| 404 | Coolant |
| 500 | Bearing |
| 501 | Generator housing |
| 502 | Stator chamber |
| 503 | Stator coils |
| 504 | Stator iron/stator yoke |
| 505 | Stator housing |
| 506 | Rotor-stator gap |
| 507 | Generator chamber |
| 508 | Rotor housing |
| 509 | Rotor chamber |
| 600 | Superconducting generator layout |
| 601 | Stator housing outer shell/outer frame/stator back iron |
| 602 | Stator housing inner shell |
| 603 | Superconducting rotor coils |
| 604 | Rotor support |
| 605 | Rotor iron |
| 606 | Rotor housing outer shell |
| 700 | Fastening means/bolt/screw |
| 701 | Stator housing end plate |
| 702 | First inner shell element/plate |
| 703 | Second inner shell element/plate |
| 704 | Wedge |
| 705 | Protrusion/stator teeth |
| 706 | Recess |
| 707 | Seal/O-ring |
| 708 | Pressure plate |
| 709 | Fastening means/bolt/screw |
| 710 | Torque transferring profile/stiffener plate |
| 711 | Seal |
| 712 | Laminated stack/stack of laminated plates |
| 713 | Cooling channel |

What is claimed is:

1. A wind turbine comprising:
a wind turbine tower
a nacelle provided on the wind turbine
a wind turbine rotor hub rotatably mounted at the nacelle, the wind turbine rotor hub having at least one wind turbine blade mounted thereon
a shaft coupled to the wind turbine rotor hub, and
a generator coupled to the shaft, which generator comprises a rotor arranged rotatably in relation to a stator, which rotor comprises at least one superconducting rotor coil in a rotor chamber encapsulated by a rotor housing, and which stator comprises at least one stator coil of a conducting material and supported by a stator iron,
where the stator coil is in a stator chamber encapsulated by a stator housing; the superconducting rotor coil and the stator coil being arranged to have interacting magnetic fields for inducing a current in the stator coil when the rotor is rotated, and where there is a rotor-stator gap between the rotor housing and the stator housing, wherein
the stator housing comprises a stator inner shell facing the rotor housing, wherein the stator inner shell comprises at least one inner shell element which is arranged between the stator iron and a stator housing end plate.

2. A wind turbine according to claim 1, wherein the stator housing end plate comprises a recess in which the inner shell element is placed, wherein a seal is arranged.

3. A wind turbine according to claim 1, wherein the stator housing end plate is attached to the inner shell element and a contact area between the stator housing end plate and the inner shell element is sealed off by a sealing material.

4. A wind turbine according to claim 1, wherein at least one pressure plate is arranged on at least one orifice of the stator iron and is connected to a stator housing outer shell and the inner shell element.

5. A wind turbine according to claim 4, wherein a torque transferring profile is arranged on a first side of the pressure plate and is connected to the stator housing outer shell and the pressure plate.

6. A wind turbine according to claim 1, wherein the stator inner shell comprises a second inner shell element which overlaps at least a portion of the first inner shell element, and that the first inner shell element is attached to the second inner shell element in the overlapping area.

7. A wind turbine according to claim 6, wherein the first inner shell element form a part of the second inner shell element.

8. A wind turbine according to claim 6, wherein the second inner shell element is attached to at least one wedge in the stator iron.

9. A wind turbine according to claim 6, wherein the second inner shell element is attached to at least one stator teeth in the stator iron.

10. A wind turbine according to claim 6, wherein at least one of the inner shell elements comprises at least one rib or protrusion arranged on an inner side facing away from the rotor assembly.

11. A wind turbine according to claim 1, wherein the stator chamber is at least partially filled with a coolant that is thermally coupled to the stator coil.

12. A wind turbine according to claim 11, wherein the coolant is at least one of an anticorrosive, a lubricant, and a combination of an anticorrosive and a lubricant.

13. A wind turbine according to claim 12, wherein the coolant is a transformer oil.

14. A wind turbine according to claim 11, wherein the stator chamber is connected to a stator cooling system and configured to circulate the coolant.

15. A wind turbine according to claim 1, wherein the rotor housing is connected to a rotor cooling system to cool the superconducting rotor coil to a superconducting state in the rotor chamber.

16. A wind turbine according to claim 15, wherein the rotor cooling system cools the superconducting rotor coil to a temperature between 4° K and 120° K.

17. A wind turbine according to claim 15, wherein the rotor cooling system cools the superconducting rotor coil to a temperature between 25° K and 80° K.

18. A wind turbine according to claim 15, wherein the rotor cooling system cools the superconducting rotor coil to a temperature between 25° K and 35° K.

19. A wind turbine according to claim 14, wherein the rotor housing is connected to a rotor cooling system to cool the superconducting rotor coil to a superconducting state in the rotor chamber and wherein at least one of the coolant and the stator cooling system is coupled to the rotor cooling system.

20. A wind turbine according to claim 1, wherein the rotor housing and the stator housing are in a generator chamber enclosed by a generator housing.

21. A wind turbine according to claim 20, wherein the generator chamber has evacuated of air.

* * * * *